No. 734,840. PATENTED JULY 28, 1903.
P. FEITEN.
FAT SEPARATING MACHINE.
APPLICATION FILED OCT. 11, 1901.
NO MODEL. 3 SHEETS—SHEET 3.

No. 734,840. Patented July 28, 1903.

UNITED STATES PATENT OFFICE.

PHILIP FEITEN, OF CLEVELAND, OHIO, ASSIGNOR OF TWO-THIRDS TO FREDERICK J. SCHWEITZER, OF CLEVELAND, OHIO.

FAT-SEPARATING MACHINE.

SPECIFICATION forming part of Letters Patent No. 734,840, dated July 28, 1903.

Application filed October 11, 1901. Serial No. 78,364. (No model.)

*To all whom it may concern:*

Be it known that I, PHILIP FEITEN, a citizen of the United States, residing at Cleveland, in the county of Cuyahoga and State of Ohio, have invented new and useful Improvements in Fat-Separating Machines, of which the following is a specification.

My invention relates to improvements in fat-separating machines, and pertains to a machine which is adapted to cut or separate the pure fat from the skin of hogs, all of which will be fully described hereinafter.

The object of my present invention is to provide a machine, an improvement upon the construction shown in my United States Patent No. 653,137, dated July 3, 1900, for performing the work usually performed by hand in the removing of fat from the skins of hogs and the cutting of the fat into pieces of suitable sizes and the skins into strips of suitable widths.

Figure 1:
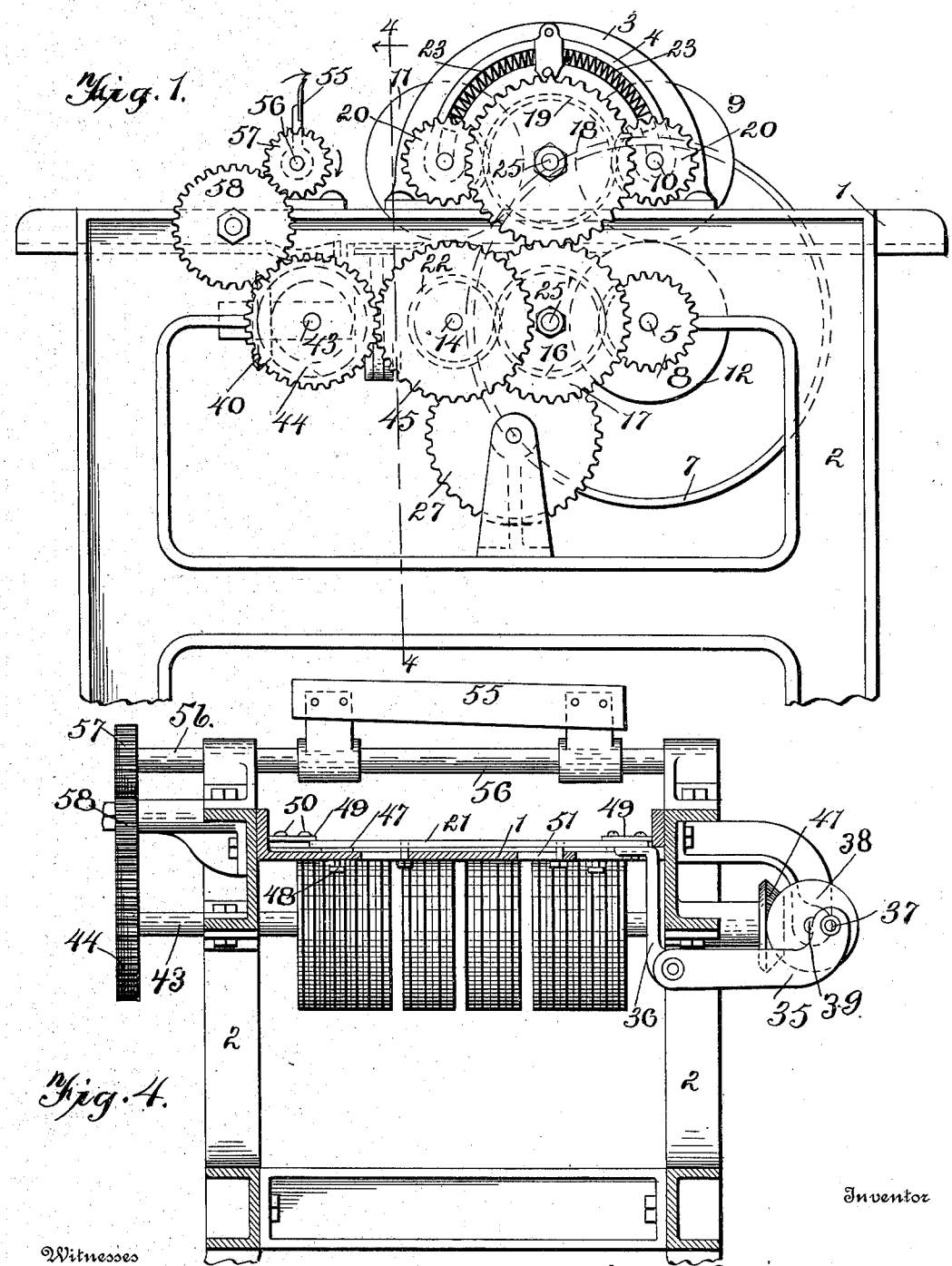
Figure 2:
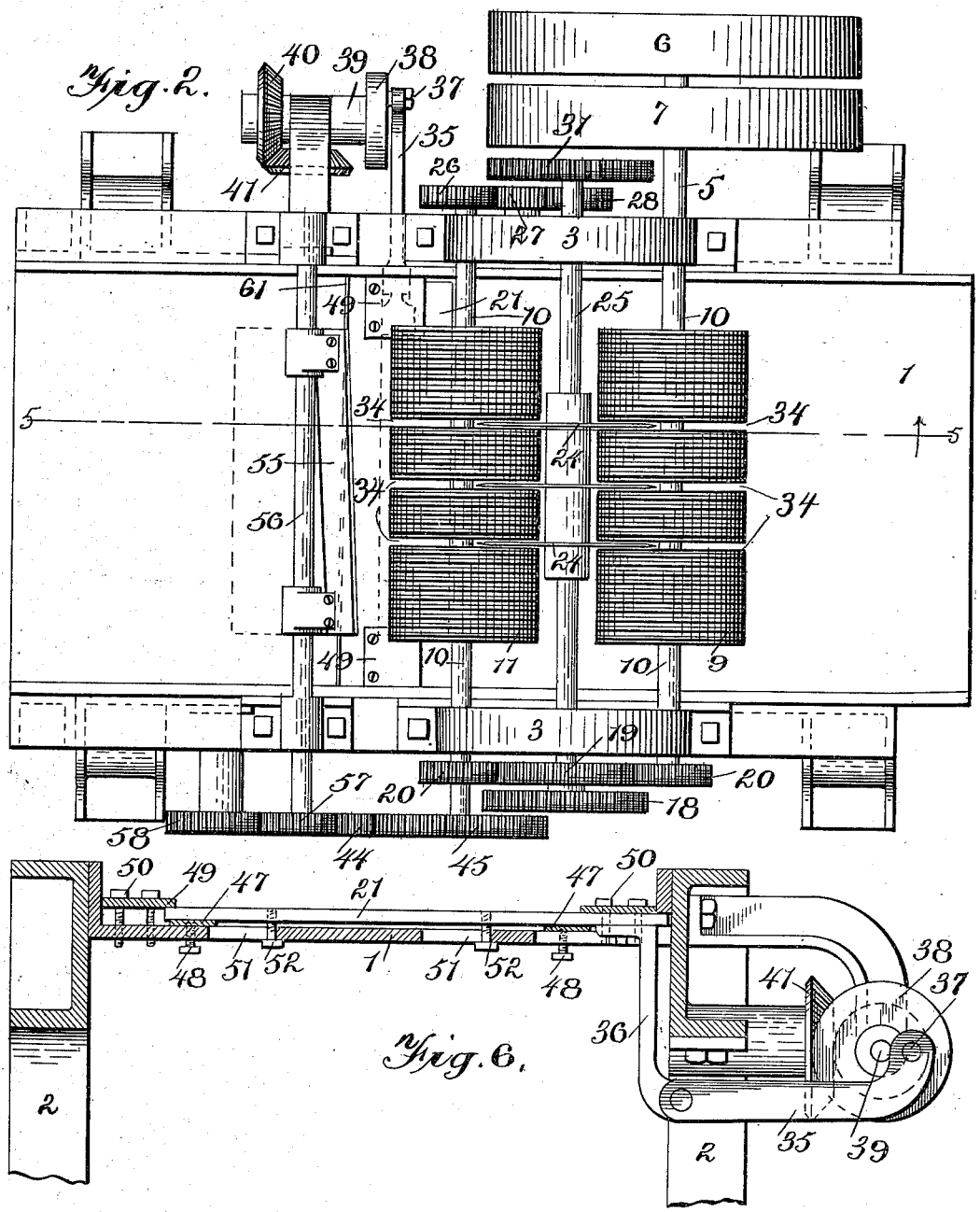
Figure 3:
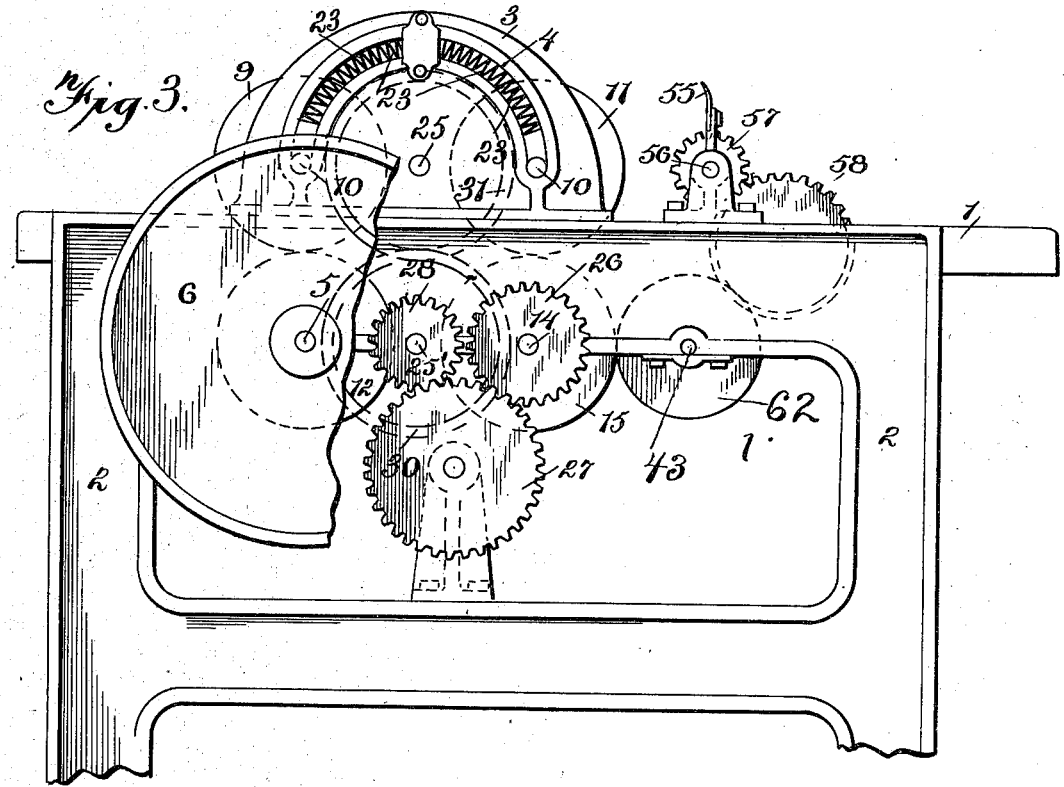
Figure 5:
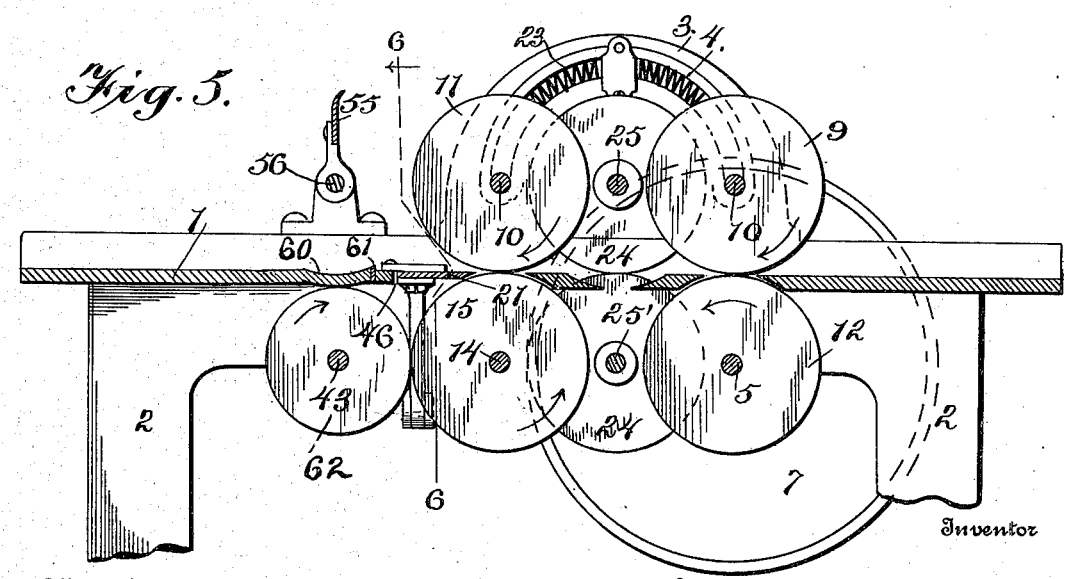

In the accompanying drawings, Figure 1 is a side elevation of a machine embodying my invention. Fig. 2 is a top plan view of the same. Fig. 3 is a view from the reverse side from that shown in Fig. 1. Fig. 4 is a view on the dotted line 4 4, Fig. 1, looking in the direction indicated by arrow. Fig. 5 is a longitudinal sectional view on the line 5 5 of Fig. 2 and looking in the direction indicated by arrow. Fig. 6 is a transverse sectional view on the line 6 6 of Fig. 5, the rolls and gears being omitted.

Referring now to the drawings, 1 indicates a suitable stationary table supported upon a framework 2. Extending upward from opposite sides of the framework 2 are suitable castings 3, which castings are provided with the curved slots 4 for a purpose to be presently explained. Passing transverse the machine and suitably journaled in the supporting-frame below the table is a driving-shaft 5. Attached to one end of this driving-shaft are fast and loose pulleys 6 and 7, and attached to the opposite end of the driving-shaft and located at the opposite side of the machine is a driving pinion or gear 8. An upper feeding-roll 9 has the ends of its shaft 10 journaled in one end of the curved slot 4, and an upper delivery-roll 11 has its opposite ends journaled in the opposite ends of the curved slots 4, formed, as before stated, in the castings 3. Connected to and carried by the drive-shaft 5 is a lower feeding-roll 12, and carried by a suitable shaft 14, journaled below the table, is a lower delivery-roll 15. The upper feeding and delivery rolls are driven from the driving-pinion 8 through the intervention of a gear 16, in mesh with the gear 8, and a gear 17, attached to the gear 16, the gear 17 engaging with a gear 18. A gear 19 is attached to the gear 18 and engages with the pinions 20, which are attached, respectively, to the adjacent ends of the upper feeding and delivery rolls. This arrangement causes the upper feeding and delivery rolls and the lower feeding-roll to rotate in the proper direction for feeding the skin with the fat thereon to the knife 21 (to be more fully described hereinafter,) which serves to separate the fat from the skin. It will be understood that the gears 16, 17, 18, and 19 are simply idler or loose gears, serving merely as means for rotating the feeding and delivery rolls. The lower delivery-roll 15 is driven through the medium of the gear 22, which is attached to its shaft 14 and in engagement with the aforesaid gear 16. Each slot 4 of the casting 3 carries a coil-spring 23, and the end of each spring engages, respectively, the ends of the upper feeding and delivery rolls and serves to hold their feeding-surfaces normally in contact with the feeding-surfaces of their coacting lower feeding and delivery rolls, the said table being provided with transverse slots for that purpose, as clearly shown in Fig. 5. For the purpose of cutting the skin with the fat thereon into longitudinal strips before it reaches the separating-knife 21 I provide upper and lower circular slitters or cutters 24, which are suitably connected to and carried by their driving and supporting shafts 25 and 25'. The driving-shaft 25 is driven through the medium of a train of gearing which I will now explain. Connected to the shaft 14 at the opposite side of the machine from that shown in Fig. 1 and at the side of the machine shown in Fig. 3 is a pinion or gear 26, which pinion or gear is in mesh with a larger gear 27. This latter gear is in turn in engagement with a pinion or gear 28, carried by the lower circular slitter or cutter shaft 25'. Carried by the shaft 25' and located outside of the gears 26, 27, and 28 is a gear 30, which in turn is in engagement with a gear 31, the latter gear being attached to the upper slitter-shaft 25. Through the means of this arrangement the upper and lower slitters are properly revolved for cutting the skin with the fat thereon into suitable longitudinal strips. For the purpose of accommodating the circular slitters the upper and lower feeding and delivery rolls are provided with peripheral grooves 34, as clearly shown in Fig. 2. For the purpose of enabling the separating-knife 21 to more easily and thoroughly remove the fat from the skin I cause the said knife to reciprocate horizontally in a direction transverse the machine. The means for accomplishing this consists in supporting the knife upon a suitable bearing (which will be presently explained) and upon which it is reciprocated. The means for reciprocating the knife consists of a pitman or link 35, having its inner end connected with a depending standard 36, the standard in turn being suitably screwed or bolted to the adjacent end of the knife 21, as clearly shown in Fig. 6. The opposite end of the link or pitman 35 is journaled upon a suitable wrist-pin 37, carried by a disk 38, the said disk 38 being connected to a counter-shaft 39, (shown in dotted lines, Fig. 2,) the opposite end of the counter-shaft 39 carrying a bevel-gear 40. This bevel-gear 40 in turn meshes with the corresponding bevel-gear 41, which is attached to the adjacent end of a transversely-arranged shaft 43. This shaft 43 is journaled in the frame below the table and carries at the end opposite to the bevel-gear 41 a suitable gear 44, and this gear 44 is in mesh with a gear 45, attached to the adjacent end of the aforementioned shaft 14. Through the medium of this mechanism the knife is given a reciprocating movement, as will be readily understood, as the skin with the fat thereon is fed thereto. The said reciprocating knife 21 is located in a transverse opening 46, Fig. 5, and rests upon suitable adjustable plates or washers 47, Fig. 6, for the purpose of permitting the knife to be adjusted vertically to permit of the machine being regulated to accomplish the very best possible results. The adjustment is effected through the medium of suitable adjusting-screws 48, which either carry or engage the plates or washers 47, and the knife is thereby forced upward against suitable vertically-adjustable plates 49, located thereabove. These plates 49 are adjustably connected with the table or bedplate 1 through the medium of suitable adjusting bolts or screws 50. The bed-plate or table at this point is located below the knife, as shown in Fig. 5, and provided with transverse slots 51, through which guiding-bolts 52 pass, the said bolts being screwed into the separating-knife 21, all of which is clearly shown in Fig. 6. In addition to cutting the skin with the fat thereon in the longitudinal strips it is desirable to cut the fat (after separation from the skin) into suitable blocks or pieces, and this is accomplished through the intervention of a revolving knife 55. This revolving knife is suitably connected to a shaft 56, which in turn carries at one end (see Fig. 1) a suitable pinion 57, and this pinion in turn meshes with an idler-gear 58, and this idler-gear is in turn in mesh with the gear 44. This arrangement gives the knife a rotation in the direction indicated by arrow in Fig. 1, and the proper direction for the cutting of the separated fat into suitable blocks or pieces. Carried on the shaft 43 is what I term a "grab-roll" 62, which is in engagement with the lower delivery-roll 15 and which serves to grab the skin as it passes below the knife 21 and prevents it from buckling and assists in delivering the skin with the fat thereon to the said knife, and the skin is then delivered either upon the floor or in any suitable receptacle. The table 1 is suitably recessed, as shown at 60, to permit the revolution of the knife 55, and located at the front end of this recess portion is a stationary or shearing knife 61, with which the knife 55 engages for the purpose of aiding in cutting up the fat, as before explained.

In operation the skin with the fat thereon is fed into the right-hand end of the machine, Fig. 1, which is termed the "receiving" end of the machine, and is caught by the roughened upper and lower feeding-rolls 9 and 12 and carried to the upper and lower circular slitters, which cut the skin with the fat thereon into longitudinal slits. These strips are then caught by the upper and lower delivery-rolls 11 and 15 and carried thereby to the separating-knife. The skin is fed to the machine with the fat uppermost, whereby the skin passes through an opening immediately below the cutting edge of the separating-knife 21 below the machine into a receptacle upon the floor, while the fat passes around over the top of the table and is cut into suitable-sized pieces or blocks through the medium of the revolving knife 55. The cut fat then passes to the delivery end of the machine and is either forced therefrom by the succeeding pieces of fat or removed therefrom in any desired manner.

Having thus described my invention, what I claim, and desire to secure by Letters Patent, is—

1. A fat-separating machine comprising a table, feeding-rolls located at the feeding end of the table, a separating-knife located beyond the feeding-rolls, delivery-rolls located between the said knife and the feeding-rolls, and upwardly-extending castings provided with segmental slots, the said slots forming bearings for the upper feed-rolls and provided with springs engaging the said bearings of the rolls for holding the upper feed and delivery rolls in contact with their coacting lower rolls, substantially as described.

2. A fat-separating machine comprising a table feeding-rollers located adjacent one end of the table and grooves in their outer periphery, delivery-rolls in rear of said feeding-rolls and having grooves in their outer periphery, a transverse shaft located between the feeding and delivery rolls and circular cutters mounted upon said shaft and rotating in corresponding grooves in both the feeding and delivery rolls, substantially as described.

3. A fat-separating machine comprising a table, feeding-rolls located at the inlet end of the table, a separating-knife, delivery-rolls located between the feed-rolls and the said knife, the upper feed and delivery rolls provided with circumferential grooves, a shaft extending transverse the machine at a point between the upper feeding and delivery rolls, the said shaft provided with transversely-arranged circular cutters located in the grooves of the said upper rolls, substantially as described.

4. A fat-separating machine comprising a stationary table, a delivery means, a slideway adjacent said delivery means, a transversely-reciprocating separating-knife carried by said slideway, means for reciprocating said knife, and means for vertically adjusting said knife in said guideway, whereby the knife is adjusted for different thicknesses of fat, substantially as described.

5. A fat-separating machine comprising a table, feeding-rolls located at the inlet end of the table, delivery-rolls adjacent the feeding-rolls, rotary knives between the feeding and delivery rolls, a guideway in rear of said delivery-rolls, a reciprocating knife in said guideway, means for vertically adjusting said knife in the guideway, and a rotary transverse knife in rear of said reciprocating knife, substantially as described.

6. A fat-separating machine comprising a table, feeding-rolls located at the inlet end of the table, a separating-knife, delivery-rolls located between the feed-rolls and the knife, rotary longitudinal knives between the feeding and the delivery rolls, and a rotary transverse knife behind the separating-knife, substantially as described.

7. A fat-separating machine comprising a table, feeding-rolls located at the inlet end of the table, a reciprocating separating-knife, delivery-rolls located between the feed-rolls and said knife, grooves carried by the upper feeding and delivery rolls, a rotary shaft between said rolls, longitudinally-arranged knives carried by said shaft and entering said grooves, and a transverse rotary knife back of said reciprocating knife, substantially as described.

8. A fat-separating machine comprising feeding-rolls, a vertically-adjustable reciprocating separating-knife, delivery-rolls between the feeding-rolls and the separating-knife, rotary knives between the delivery and feeding rolls, and a rotary transverse knife in rear of the separating-knife, substantially as described.

9. A fat-separating machine comprising a stationary table having transverse slots therethrough, a delivery means, guiding-plates carried by said table adjacent said delivery means, a transverse reciprocating knife between said guiding-plates, downwardly-extending members carried by said knife and moving in the slots in the table, means for reciprocating said knife and means for vertically adjusting said plates, whereby the said knife is vertically adjustable.

10. A fat-separating machine comprising a stationary table having transverse slots therein, a delivery means, guide-plates carried by said table, a reciprocating knife between said guide-plates, downwardly-extending members carried by the knife and reciprocating in said slots, means for reciprocating said knife, set-screws passing up through said table and engaging the guide-plates below the knife, and set-screws passing through the plates above the knife and through the table.

11. A fat-separating machine comprising a table having upwardly-extending members provided with segmental slots, feeding and delivery rolls mounted in said slots and having circular grooves therein, springs bearing upon said rolls, rotary knives between said rolls and extending in said grooves and a separating-knife in rear of said rolls, substantially as described.

12. A fat-separating machine comprising a table having upwardly-extending members provided with segmental slots, feeding and delivery rolls mounted in said slots and having circular grooves therein, springs bearing upon said rolls, rotary knives between said rolls and extending in said grooves, a separating-knife in rear of said rolls, and a transverse rotary knife in rear of the separating-knife, substantially as described.

13. In a fat-separating machine, the combination with a table, of feeding and delivery rolls, having segmental grooves, springs normally holding said rolls down, circular cutters between said rolls and extending in said grooves, a separating-knife in rear of said rolls and a transverse rotary cutter in rear of said separating-knife, substantially as described.

14. A fat-separating machine comprising a table, feeding-rollers located at the inlet end of the table, rotary knives in rear of said rollers, delivery-rollers in rear of said knives, a reciprocating frame in rear of said delivery-rollers, a knife carried by said frame, means for vertically adjusting said knife within said frame, and a rotary horizontally-arranged knife in rear of said reciprocating frame, substantially as described.

In testimony whereof I have hereunto set my hand in the presence of two subscribing witnesses.

PHILIP FEITEN.

Witnesses:
J. H. SCHNEIDER,
J. H. SALTSMAN.